United States Patent [19]
Jefferies

[11] Patent Number: 5,568,366
[45] Date of Patent: Oct. 22, 1996

[54] COMPACT SOLAR SIMULATOR WITH A SMALL SUBTENSE ANGLE AND CONTROLLED MAGNIFICATION OPTICS

[75] Inventor: Kent S. Jefferies, Fairview Park, Ohio

[73] Assignee: The United States of America as represented by the Administrator of the National Aeronautics and Space Administration, Washington, D.C.

[21] Appl. No.: 322,862

[22] Filed: Oct. 11, 1994

[51] Int. Cl.$^6$ .................................................... F21V 7/00
[52] U.S. Cl. ........................ 362/1; 362/35; 362/234; 362/245; 362/283; 362/301; 362/373; 73/865.6; 359/216; 359/853; 359/857
[58] Field of Search ..................... 359/850, 851, 359/853, 854, 856, 857, 204, 212, 216; 73/865.6; 362/1, 2, 35, 232, 234, 241, 244, 245, 247, 283, 298, 346, 282, 299, 301, 294, 373

[56] References Cited

U.S. PATENT DOCUMENTS

| | | | |
|---|---|---|---|
| 1,400,990 | 12/1921 | Robin | 362/232 |
| 3,247,367 | 4/1966 | Rayces | 362/241 |
| 3,264,467 | 8/1966 | Mann et al. | 362/234 |
| 3,296,432 | 1/1967 | LeVantine | 362/302 |
| 3,302,463 | 2/1967 | Marfone et al. | 73/865.6 |
| 3,379,067 | 4/1968 | Wallace et al. | 362/1 |
| 3,405,561 | 10/1968 | Bogart | 73/865.6 |
| 3,645,606 | 2/1972 | La Vantine | 359/853 |
| 3,701,521 | 10/1972 | LeVantine | 269/48 |
| 3,924,937 | 12/1975 | Munroe et al. | 359/216 |
| 4,307,528 | 12/1981 | Dewees et al. | 359/216 |
| 4,642,740 | 2/1987 | True | 362/268 |
| 4,701,023 | 10/1987 | Hager et al. | 359/838 |
| 4,933,813 | 6/1990 | Berger | 362/2 |

OTHER PUBLICATIONS

NASA Technical Memorandum 106296—Overview of the Solar Dynamic Ground Test Demonstration Program—Richard K. Shaltens, Robert V. Boyle—Aug. 8, 1993.
NASA Technical Memorandum 106393—Solar Simulator for Solar Dynamic Space Power System Testing—Kent S. Jefferies—Mar. 27, 1994.

*Primary Examiner*—Denise L. Gromada
*Assistant Examiner*—Alan B. Cariaso
*Attorney, Agent, or Firm*—Kent N. Stone; Susan D. Reinecke; Vernon Williams

[57] ABSTRACT

The present invention is directed to a method of simulating a pseudosun using a solar simulator. In the present invention the collector and lens of a lamp are designed to properly focus a plurality of light beams onto a segmented turning mirror. The path of light rays are traced from the lamp to the collector and then finally to the lens to control the solid and tangential magnification of the solar simulator. The segmented turning mirror is located at the focal point of the light beam and redirects the light into a vacuum chamber.

11 Claims, 8 Drawing Sheets

COMPACT SOLAR SIMULATOR WITH A SMALL SUBTENSE ANGLE AND CONTROLLED MAGNIFICATION OPTICS

ORIGIN OF THE INVENTION

The invention described herein was made by employees of the United States Government and may be manufactured and used for the Government for governmental purposes without the payment of any royalties thereon or therefore.

FIELD OF THE INVENTION

The present invention is directed to a solar simulator for vacuum tank testing. The solar simulator disclosed uses a lamp module with controlled magnification optics. The controlled magnification optics as well as a compact design allow for a small subtense angle and increased efficiency.

Solar simulators have been used for a variety of purposes including vacuum tank testing of solar photovoltaic cells and other systems intended for use in space. The present invention discloses both a compact solar simulator and a lamp module with controlled magnification optics located within the simulator.

Prior art systems include one or more lamp modules, an optical mixer, and a collimating mirror. Each prior art lamp module contains a lamp and an elliptically shaped, reflective collector for focusing light onto an optical mixer. The optical mixer receives lights from the lamp modules and scrambles the light to produce a uniform beam which projects to the collimating mirror. The collimating mirror reflects the light and produces a parallel beam which illuminates a test area.

The present invention is the first solar simulator that will be used for testing a solar dynamic power system. Important solar simulator requirements for vacuum tank testing of the solar dynamic system are the intensity and size of the light beam and the angle subtended by the light source. To effectively test the solar dynamic system, the simulator must be capable of providing at least as much radiant flux as the 1370 watts/sq m produced by the Sun in low Earth orbit. This intensity must be provided to the entire area of the solar dynamic concentrator, which has a diameter of 4.5 m. Also, the angular size of the apparent light source (pseudosun) must be comparable to the angular size of the real Sun so that the concentrator can focus the light into the solar dynamic receiver aperture. The angular size of the Sun as viewed from the Earth is the 1.39 million kilometers diameter of the Sun divided by the 149.7 million kilometer distance from the Sun to the Earth or 9.29 milliradians which is 0.53 degrees. The radiant energy requirements for solar dynamic testing increase almost exponentially above the 0.53 degrees subtense angle therefore subtense angles above 1.5 degrees are not practical.

The major disadvantages of prior art solar simulators are the large size and high cost of the simulator and the large angular size of the pseudo sun. Most prior art solar simulators have pseudo suns whose diameters subtend 4 degrees or more. However, the solar dynamic test chose an angular size of one degree, which results in a requirement of 1600 watts/sq m of radiant energy. Although it is possible to achieve the one degree subtense angle and 1600 watts/sq m using the prior art, the resulting simulator design is large and expensive. Two competing designs shown in FIG. 1 and 2 were considered for the solar simulator for solar dynamic testing. The design in FIG. 1 is based on the prior art whereas the design in FIG. 2 is based on the invention described herein. The prior art design is about twice as expensive because it has over twice as many arc lamps and a large collimating mirror that was determined to be unnecessary and undesirable for testing the solar dynamic system.

The major disadvantages of the prior art lamp modules are caused by the elliptical collectors which have non-uniform magnification of the arc at the focus. The innermost points of the collector are quite close to the arc and produce a large arc image at the focus; the outermost portions of the collector are further from the arc and therefore have less magnification thereby producing a smaller arc image at the focus. As a result of this non-uniform magnification, a smaller portion of the light enters the optical mixer. Efficiency is also lost within the optical mixer due to blockage and transmission losses.

It is therefore an object of the present invention to provide 1600 watts/sq m of artificial sunlight to the 4.5 m diameter solar dynamic concentrator from a pseudo sun with a diameter that subtends only one degree as viewed from the solar dynamic concentrator, It is a further object of the present invention to decrease the space required for housing a solar simulator, It is still a further object to attain light intensity uniformity at the test plane, It is still yet a further object of the invention to use segmented reflection surfaces to combine beams from several lamp modules at the pseudosun, It is another object to remove the optical mixer, It is a further object to achieve uniform magnification of the area of the arc to the area of the image at the focus by varying the tangential magnification so that the product of tangential and sagittal magnification is a constant, It is another object of the invention to vary the tangential magnification so that the product of tangential and sagittal magnification varies to compensate for angular variation of arc lamp brightness and optical efficiency so that intensity at the test plane is constant, It is still yet another object of the invention to redistribute light energy from a collector to produce a pattern with equal areas corresponding to areas on the arc lamp that provide equal amounts of light.

DESCRIPTION OF RELATED ART

U.S. Pat. No. 3,247,367 to Rayces discloses a solar simulator used as an artificial sun in the testing of space vehicles. U.S. Pat. No. 3,296,432 to Le Vantine is directed to a plurality of high intensity light sources arranged to provide a beam of radiation with a spectral distribution which substantially corresponds to the Sun. Patent No. 3,701,521 to Le Vantine describes a means for making a multi-facet substantially parabolic collimator. U.S. Pat. No. 4,642,740 discloses a high efficiency light collection system for a projector which provides constant tangential magnification. U.S. Pat. No. 4,933,813 to Berger discloses a sunlight simulator for radiating and channeling ultra-violet radiation.

SUMMARY OF THE INVENTION

The present invention is directed to a solar simulator with a small angle subtended by the pseudosun to enable solar dynamic testing. The invention is intended to produce a more efficient simulation of solar illumination, at reduced cost and occupying less volume. To achieve this goal a more efficient lamp module is introduced that creates uniformity directly on a test plane, a segmented reflector replaces the optical mixer, and, for solar dynamic testing, the collimating mirror is omitted.

Increased efficiency is achieved in the solar simulator by removing both the optical mixer and the collimating mirror, found in the prior art. The optical mixer is replaced in the present invention by a segmented turning mirror. The collimating mirror is not needed for the planned solar dynamic testing, but could be added if the simulator is used for other purposes. The overall design of the lamp module is also changed to better focus the light out of the lamp module onto the turning mirror and to provide for light flux uniformity at the test plane.

Reduced cost results from the reduced number of lamp modules and the elimination of the collimating mirror. The lamp housing volume is greatly reduced by using the segmented turning mirror to combine beams instead of combining them at the optical mixer.

The reduction in volume of the lamp housing is possible because of the reduction of the number of lamp modules and because in the prior art a projection angle must encompass all nineteen lamp modules whereas in the invention a projection angle only needs to encompass one lamp module. Volume within the vacuum tank that would have been occupied by the collimating mirror and the parallel beam is not needed since the collimating mirror is eliminated in the design.

The lamp module disclosed in the present invention replaces the elliptical collector of prior art lamp modules with a two stage optical system consisting of an aconic collector and an aspheric lens. The collector and lens curvatures control the tangential magnification of the arc at the focus. The curvatures increase the tangential magnification as the sagittal magnification decreases to maintain an approximately uniform combined magnification of the arc at the focus. The ultimate goal of controlling the magnification is to achieve a uniform intensity for all portions of the light beam leaving the focus. However, the maximum tangential magnification is limited in the outermost portion of the beam to avoid loss of light in this region.

BRIEF DESCRIPTION OF THE DRAWINGS

The objects, advantages and novel features of the invention will be more fully apparent from the following detailed description when read in connection with the accompanying drawings in which.

DESCRIPTION OF THE PREFERRED EMBODIMENT

Figure 1:
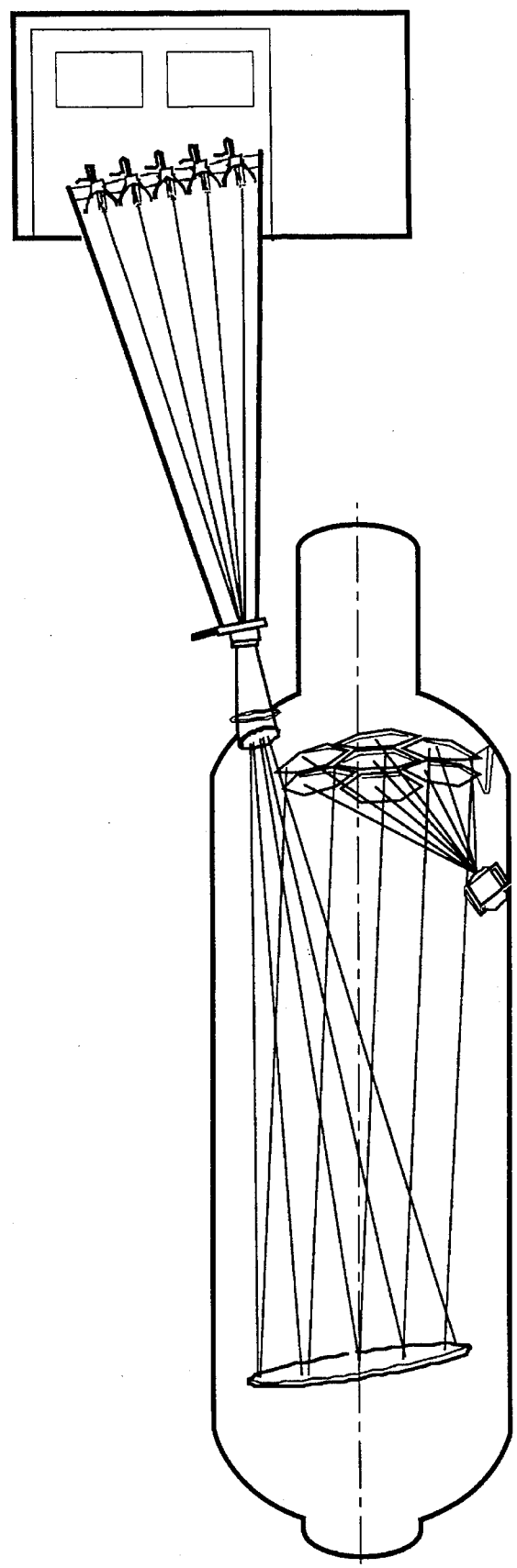
FIG. 1. displays the prior art solar simulator and vacuum chamber.
Figure 2:
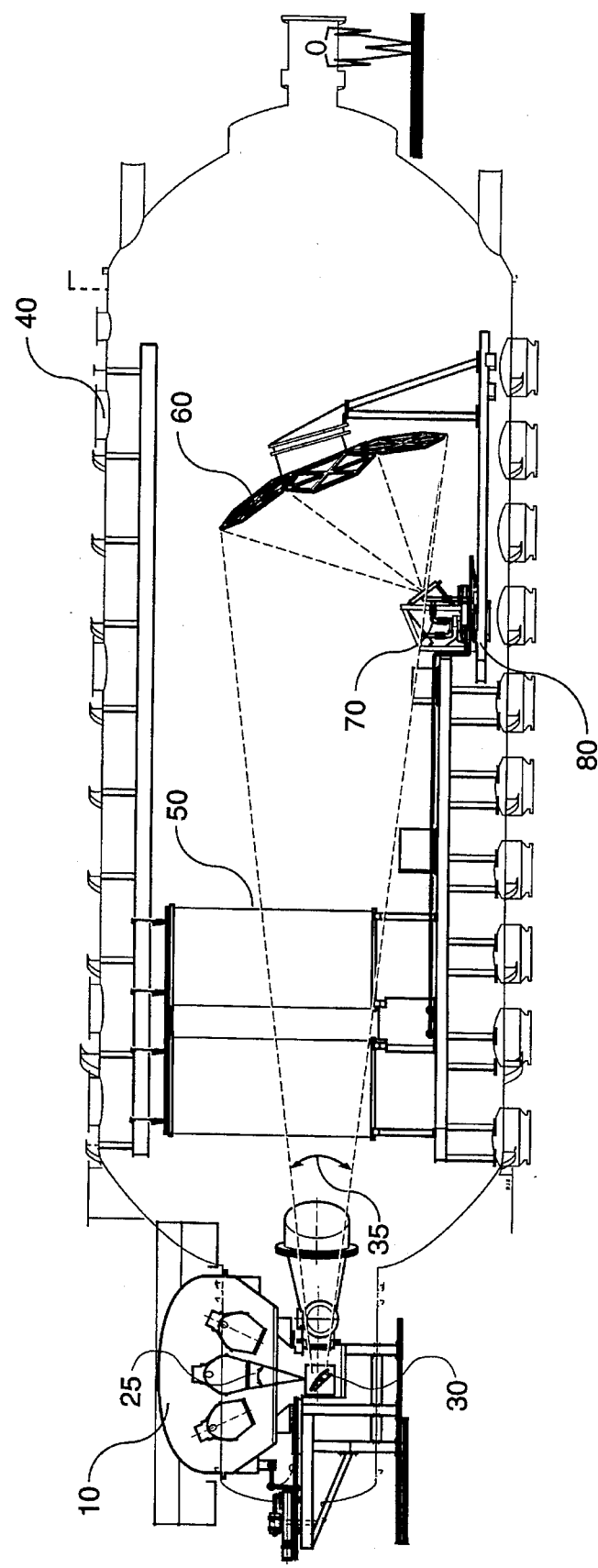
FIG. 2. displays the overall system including the solar simulator and the vacuum chamber.

The solar dynamic test system is displayed in FIG. 2. A solar simulator 10 generates light which is reflected by a turning mirror 30 into a vacuum chamber 40. A concentrator 60 receives the light, and focuses the light into a receiver 70. A Brayton engine 80 converts heat from the receiver into electricity. Waste heat from this engine is radiated by radiator panels 50. The solar simulator 10 is normal to the horizontal plane of the vacuum chamber 40. When the lamps are oriented in a horizontal position as displayed in FIG. 1, an arc struck between the cathode and the anode will drift off of a center line from the anode to the cathode, therefore additional measures have to be taken to maintain a stable arc. On the other hand when the lamp is in the vertical orientation shown in FIG. 2, an arc struck between the anode and the cathode remains on the vertical axis. Therefore, the vertical orientation of the lamp produces an inherently stable arc.

Figure 3:
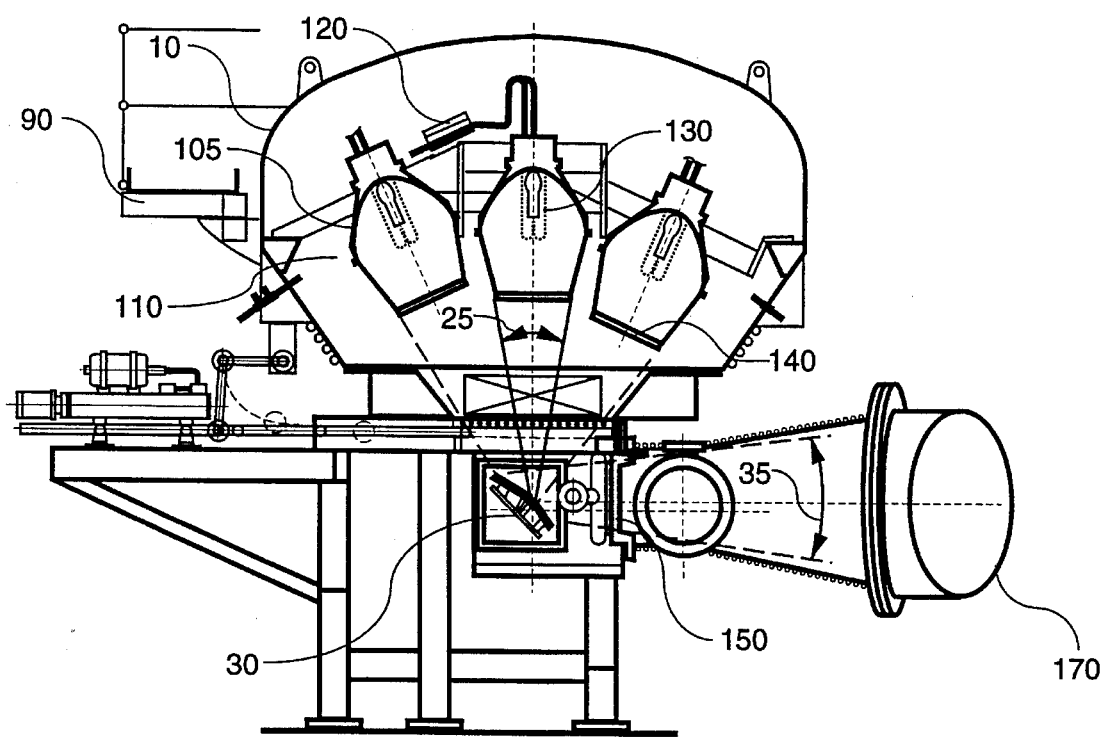
FIG. 3. displays the solar simulator portion of the system.

FIG. 3 displays the solar simulator. A work platform 90 provides access for installing and adjusting the lamp modules 110. Each lamp module 110 contains an integral cooling water and electrical supply 120, a xenon arc lamp 130 for generating light, a collector 105 for reflecting the generated light, and a lens 140 for focusing the light onto one segment of the segmented turning mirror 30. Each segment of the segmented turning mirror 30, receives light from one of the lamp modules in the solar simulator. The turning mirror then turns each of the light beams so that they reflect toward a tank window 150 through the tank port 170 into the vacuum chamber.

Figure 4:
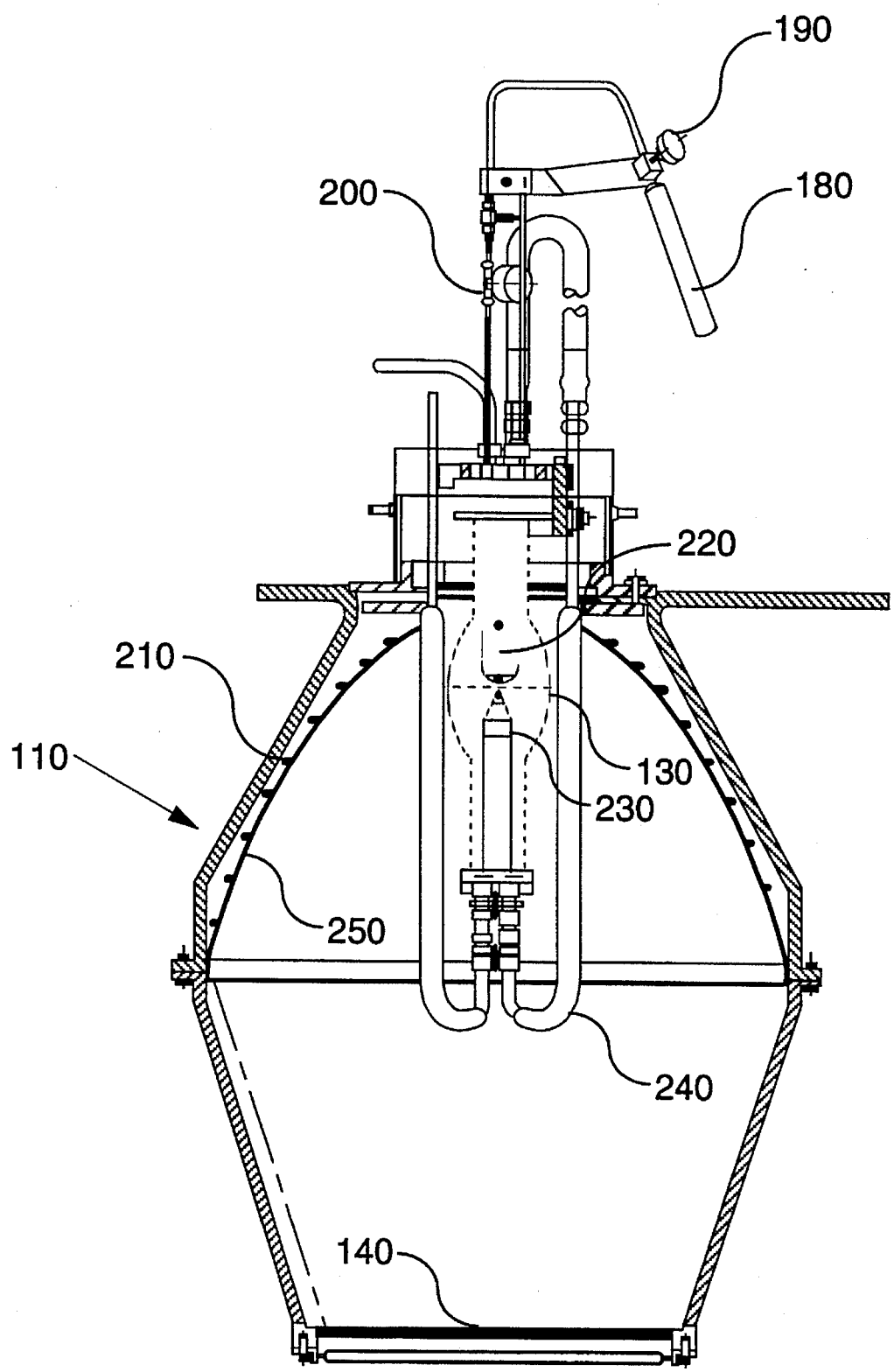
FIG. 4. displays one of nine identical arc lamp modules in the solar simulator.

FIG. 4 displays the lamp module 110. A valve 190 controls the flow of xenon, from the xenon reservoir 180. A pressure gauge 200 monitors the pressure in the xenon arc lamp 130. The xenon arc lamp 130 consists of an anode 220 and a cathode 230 between which an electric arc is struck to generate light. The lamp 130 is cooled by deionized water flowing through stainless steel tubes 240. The stainless steel tubes 240 also conduct electricity to the arc lamp anode 220 and cathode 230. Light from the xenon lamp 130 is reflected off of the reflective surface 250 and focused through the lens 140 onto the turning mirror 30 in FIG. 3.

Figure 5:
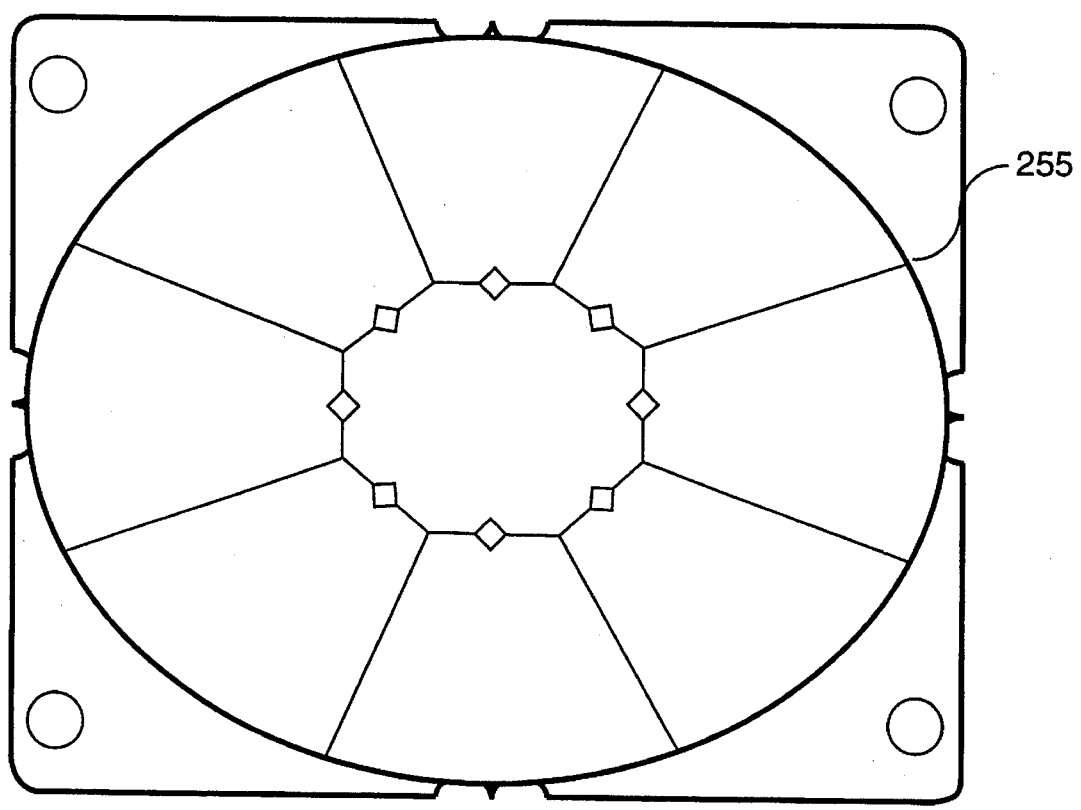
FIG. 5. displays the turning mirror for superimposing beams from the nine lamp modules on the solar dynamic concentrator.

FIG. 5 displays the geometry of a segmented turning mirror which consist of a central segment and eight segments surrounding it for redirecting the nine beams from the nine lamp modules and superimposing these beams on the solar dynamic concentrator. Each turning mirror segment is positioned at the focal point of the beam generated by one of the lamp modules. The turning mirror includes tubes for cooling water which cools each of the segments 255 that are shown in FIG. 5. Each of the nine reflective segments takes light from one of the lamp modules and illuminates the entire concentrator. The segments have a slight curvature to focus the edges of the beam at the edges of the concentrator.

Figure 6:
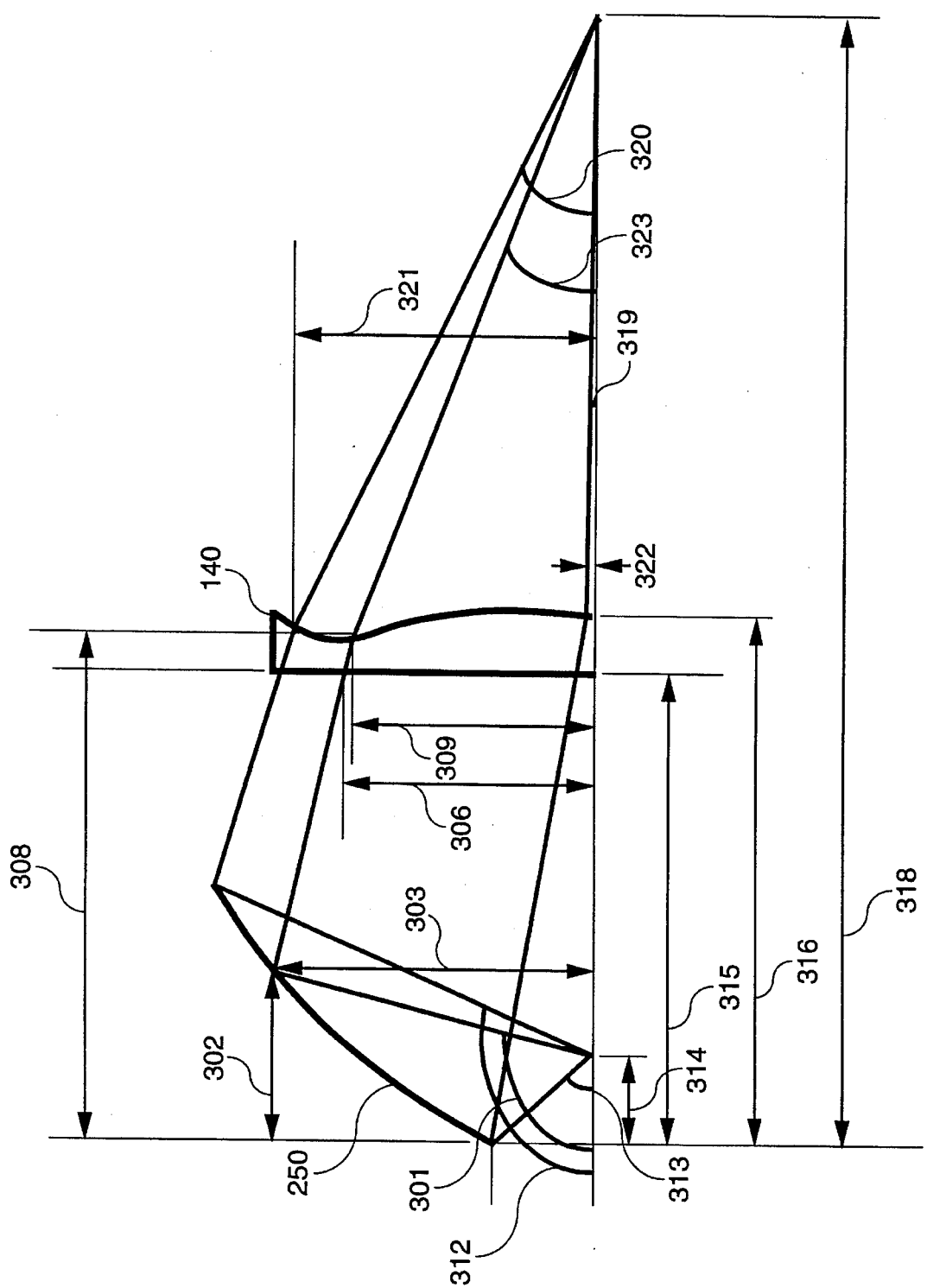
FIG. 6. displays a section of the collector and the lens, which highlights the path of light transmitted from the arc lamp through the lens to the focus.
Figure 7:
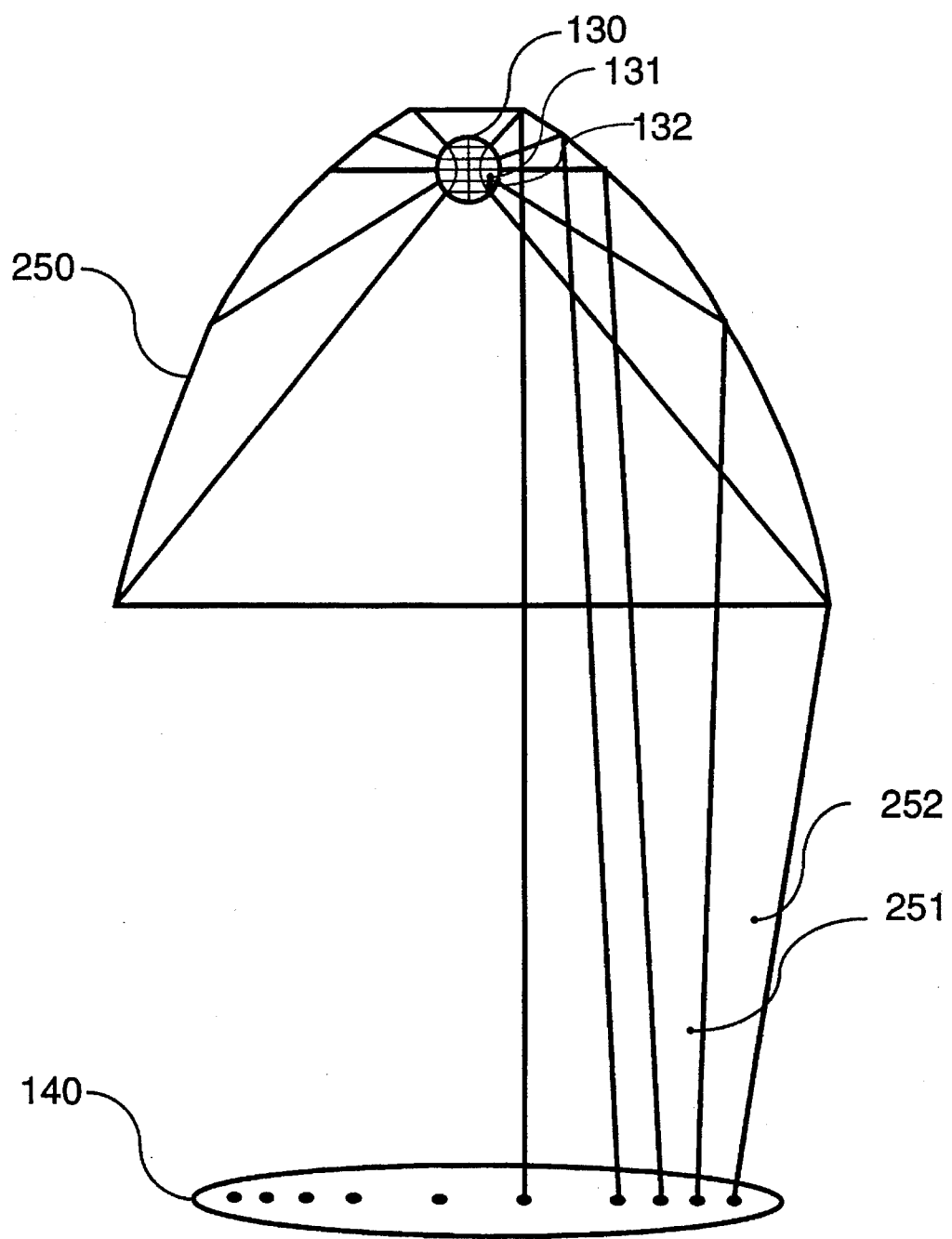
FIG. 7. displays a reflective collector with light reflecting into a focusing lens.

FIG. 6 displays the collector and lens coordinates for the preferred embodiment of the solar simulator lamp module design. This embodiment employs the controlled magnification principle while controlling the solid angle magnification. A simplified version of these concepts is illustrated in FIG. 7 and described in the description of FIG. 7. In FIG. 6, the collector 250 is displayed with the lens 140. To coordinate the relationship of the collector and the lens, specific parameters need to be defined in the system. In FIG. 6, the angle 301 of a specific ray leaving the arc is displayed. The axial coordinate 302 as well as the radial coordinate 303 of the intersection of the ray with the collector surface are displayed. The radial coordinate 306 of the intersection of the ray with the lens surface closest to the collector is displayed. The axial coordinate 308 and the radial coordinate 309 of the intersection of the ray with the lens surface furthest from the collector are shown. The ratio of the derivative of the angle 301 leaving the arc to the derivative of the angle 323 of the same ray arriving at the focus is the tangential magnification. It is also the ratio of the length of the image of the arc at the focus to the length of the arc. The magnification of the arc in the sagittal direction is the ratio of the sine of the angle 301 of the ray leaving the arc to the sine of the angle 323 of the same ray when it arrives at the focus. It is also the ratio of the radius of the image of the arc at the focus to the radius of the arc. The following chart displays the measurements of different rays as they are traced through the system as well as the tangential magnification and the sagittal magnification:

| Ray | 301<br>Ang Arc | 302<br>Z Coll | 303<br>R Coll | 306<br>RA Lens | 308<br>ZB Lens |
|---|---|---|---|---|---|
| 1 | 0.872665 | 0.000000 | 3.500000 | 0.072782 | 32.446860 |
| 2 | 0.940443 | 0.164018 | 3.800189 | 1.037250 | 32.626212 |
| 3 | 1.046808 | 0.456555 | 4.292132 | 2.036041 | 32.734647 |
| 4 | 1.162620 | 0.834162 | 4.862101 | 3.031061 | 32.770090 |
| 5 | 1.303626 | 1.399976 | 5.614877 | 4.026443 | 32.741428 |
| 6 | 1.492584 | 2.408104 | 6.746541 | 5.026727 | 32.669499 |
| 7 | 1.730587 | 4.294173 | 8.421991 | 6.034903 | 32.590910 |
| 8 | 2.073293 | 9.198363 | 11.393927 | 7.076283 | 32.592951 |

| Ray | 309<br>RB Lens | 323<br>Ang Focus | Magnification | |
|---|---|---|---|---|
| | | | Tangential | Sagittal |
| 1 | 0.040101 | 0.000773 | 0.000000 | 0.000000 |
| 2 | 1.000101 | 0.019344 | 5.199563 | 41.764834 |
| 3 | 2.000101 | 0.038752 | 5.671335 | 22.348584 |
| 4 | 3.000101 | 0.058131 | 6.429245 | 15.798333 |
| 5 | 4.000101 | 0.077396 | 8.476740 | 12.474606 |
| 6 | 5.000101 | 0.096503 | 11.188472 | 10.346790 |
| 7 | 6.000101 | 0.115472 | 14.433840 | 8.568886 |
| 8 | 7.000101 | 0.134507 | 20.000000 | 6.535271 |

The collector lens combination of FIG. 6 includes the following parameters:

| DRAWING<br>REFER-<br>ENCE | DESCRIPTION | MEASURE-<br>MENT |
|---|---|---|
| 312 | maximum angle of collected rays | 2.3017 radians |
| 313 | minimum angle of collected rays | 0.8727 radians |
| 314 | axial location of light source | 2.937 inches |
| 315 | lens flat side axial location | 32 inches |
| 316 | lens center curved side axial location | 2.4375 inches |
| 318 | axial location of focus | 84.3215 inches |
| 319 | minimum angle of beam to focus | 0.00193 radians |
| 320 | maximum angle of beam to focus | 0.14937 radians |
| 321 | outer radius of beam at lens | 7.75 inches |
| 322 | inner radius of beam at lens | 0.1 inch |

FIG. 7 illustrates the controlled magnification principle of this invention using a simpler embodiment with constant solid angle magnification. Assume that the arc lamp bulb is divided into equal areas by lines of longitude and latitude. The contour of the collector is chosen based on the locations of the latitude lines on the arc lamp bulb and the desired pattern of circles shown in FIG. 7 so that the reflections of the longitude and latitude lines subdivide the lens into equal areas. The lens 140 in FIG. 7 then redirects the light rays to a focus. Thus pencils of light from the arc lamp that have equal solid angles are redirected to pencils of light towards the focus that have equal solid angles.

Further refinements have been made to this technique to control the solid angle magnification for improved performance leading to the preferred embodiment that was shown in FIG. 6. The magnification is varied as a function of angle to compensate for variations of the arc lamp intensity and optical efficiency so as to achieve uniform illumination with respect to angle of the beam leaving the focus. Also at the extreme outer portions of the beam the tangential magnification is held constant to avoid loss of light in this region.

Figure 8:
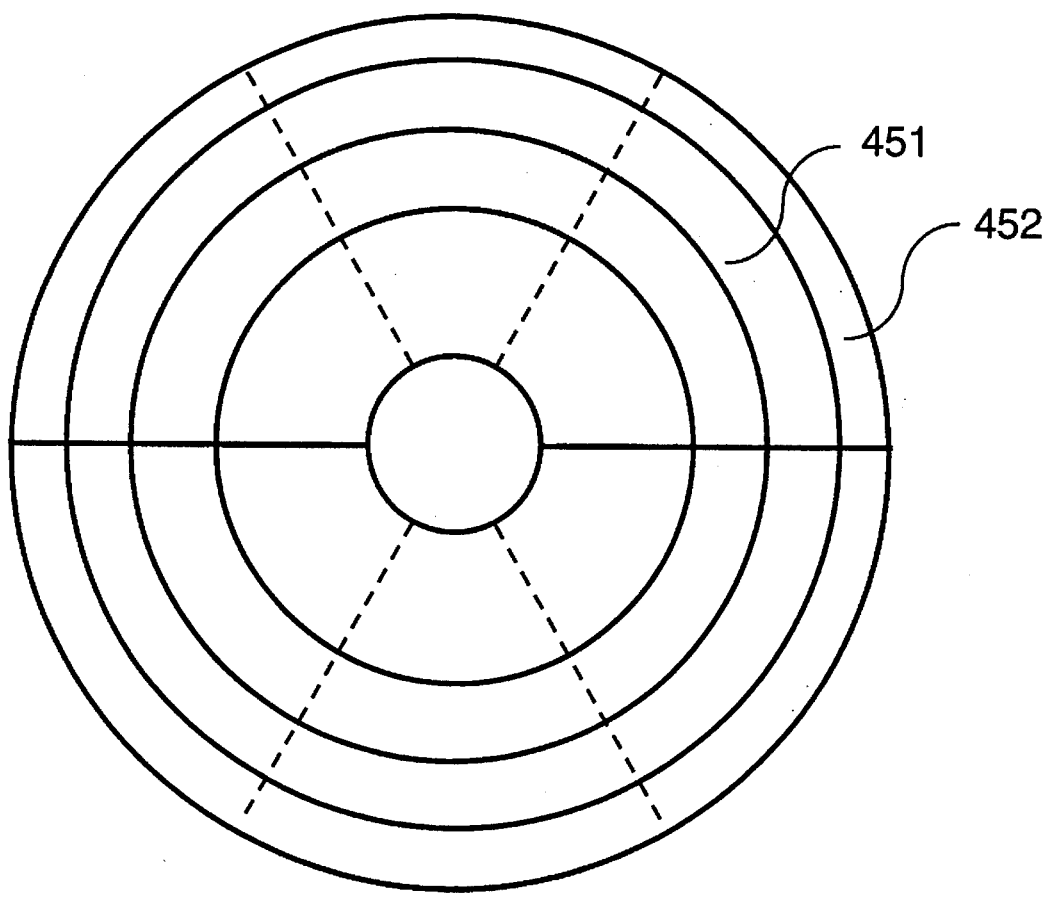
FIG. 8. displays an end view of the lens with the desired pattern of equal areas.

Therefore in FIG. 7, the bulb 130 is divided into areas displayed by 131 and 132. The areas 131 and 132 produce light beams 251 and 252 which reflect onto a specifically defined areas of the lens 140. These lens areas 451 and 452 are displayed in FIG. 8.

While the preferred embodiment of the invention is disclosed and described, it will be apparent that various modifications may be made without departing from the spirit of the invention or the scope of the subjoined claims.

What is claimed:

1. A solar dynamic facility comprising:

a solar simulator including a plurality of lamp modules, wherein each of said lamp modules contains a collector and a lens positioned such that each of said lamp modules generates a light beam to a focal point, a segmented turning mirror including a plurality of segments with each segment positioned at the focal point of at least one of said light beams, for reflecting and turning each of said plurality of light beams, and a vacuum chamber including a concentrator for receiving each of said plurality of light beams thereby simulating a pseudo sun on said concentrator.

2. A solar dynamic facility as claimed in claim 1 wherein said solar simulator is oriented normal to a horizontal plane of said vacuum chamber.

3. A solar dynamic facility as claimed in claim 1 wherein each of said plurality of segments is positioned at the focal point of one of said light beams.

4. A solar dynamic facility as claimed in claim 1 wherein each of said plurality of segments is contoured to focus said light beam for which said segment is positioned in the focal point of, onto said concentrator.

5. A solar simulator as claimed in claim 1 wherein each of said plurality of lamp modules further comprises an aconic collector for reflecting said light and an aspheric lens for focusing said light, thereby providing uniform light intensity on a surface beyond said focal point.

6. A solar simulator as claimed in claim 1 wherein each of said plurality of light beams is received by said concentrator.

7. A vacuum chamber as claimed in claim 1 further comprising, a receiver for receiving said light and generating heat, an engine coupled with said receiver for converting said heat into electricity, and radiator panels for radiating said heat.

8. A solar dynamic facility as claimed in claim 1 wherein each of said plurality of lamp modules further comprises:

a light source including equally divided areas for generating light, a lens curved to focus said light including equally divided areas therein, and a reflective collector curved to redirect light from equally divided areas on said light source to said equally divided areas on said lens thereby achieving constant solid angle magnification.

9. A solar dynamic facility as claimed in claim 8, wherein said reflective collector is an aconic collector.

10. A solar dynamic facility as claimed in claim 8 wherein said lens is an aspheric lens.

11. A solar dynamic facility as claimed in claim 1 wherein each of said plurality of lamp modules further comprises:

a light source for generating a light beam having an outer portion therein, a reflective collector curved to control solid magnification thereby achieving nearly uniform illumination without loss of light in the outer portions of said beam, and a lens curved to focus said outer portion of said light beam.

* * * * *